(12) United States Patent
Degen et al.

(10) Patent No.: US 7,386,510 B2
(45) Date of Patent: Jun. 10, 2008

(54) SYSTEM AND METHOD FOR DETECTING FRAUDULENT CALLS

(75) Inventors: Robert Degen, Marietta, GA (US); Philip Mellinger, Ellicott City, MD (US); Duane Ritter, Marietta, GA (US); Brian Prendergast, Loganville, GA (US)

(73) Assignee: First Data Corporation, Greenwood Village, CO (US)

( * ) Notice: Subject to any disclaimer, the term of this patent is extended or adjusted under 35 U.S.C. 154(b) by 1201 days.

(21) Appl. No.: 09/948,729

(22) Filed: Sep. 7, 2001

(65) Prior Publication Data

US 2003/0050880 A1    Mar. 13, 2003

(51) Int. Cl.
*G06Q 40/00* (2006.01)

(52) U.S. Cl. .............................. 705/44; 705/35; 705/38; 379/114.14

(58) Field of Classification Search ................. 705/1, 705/35, 38, 44; 455/403; 340/825; 709/230; 379/114.14
See application file for complete search history.

(56) References Cited

U.S. PATENT DOCUMENTS

| | | | | | |
|---|---|---|---|---|---|
| 5,566,234 | A | * | 10/1996 | Reed et al. | 379/188 |
| 5,602,906 | A | * | 2/1997 | Phelps | 379/114.14 |
| 5,627,886 | A | * | 5/1997 | Bowman | 379/111 |
| 5,819,226 | A | * | 10/1998 | Gopinathan et al. | 705/44 |
| 5,884,289 | A | * | 3/1999 | Anderson et al. | 705/44 |
| 6,029,154 | A | * | 2/2000 | Pettitt | 705/44 |
| 6,052,675 | A | * | 4/2000 | Checchio | 705/44 |
| 6,094,643 | A | * | 7/2000 | Anderson et al. | 705/44 |
| 6,208,720 | B1 | * | 3/2001 | Curtis et al. | 379/114.14 |
| 6,212,266 | B1 | * | 4/2001 | Busuioc | 379/189 |
| 6,254,000 | B1 | * | 7/2001 | Degen et al. | 235/380 |
| 6,330,546 | B1 | * | 12/2001 | Gopinathan et al. | 705/35 |
| 6,516,056 | B1 | * | 2/2003 | Justice et al. | 379/145 |
| 6,732,082 | B1 | * | 5/2004 | Gavan et al. | 706/10 |
| 6,947,532 | B1 | * | 9/2005 | Marchand et al. | 379/114.14 |
| 7,068,642 | B1 | * | 6/2006 | Khan | 370/352 |
| 7,096,192 | B1 | * | 8/2006 | Pettitt | 705/26 |
| 2002/0099648 | A1 | * | 7/2002 | DeVoe et al. | 705/38 |
| 2002/0099649 | A1 | * | 7/2002 | Lee et al. | 705/38 |
| 2006/0026102 | A1 | * | 2/2006 | Ryan, Jr. | 705/50 |
| 2006/0080230 | A1 | * | 4/2006 | Freiberg | 705/39 |
| 2006/0149580 | A1 | * | 7/2006 | Helsper et al. | 705/1 |
| 2006/0149674 | A1 | * | 7/2006 | Cook et al. | 705/44 |
| 2006/0190287 | A1 | * | 8/2006 | Forshaw et al. | 705/1 |

* cited by examiner

*Primary Examiner*—Jagdish N Patel
*Assistant Examiner*—Sara Chandler
(74) *Attorney, Agent, or Firm*—Townsend and Townsend and Crew LLP

(57) ABSTRACT

A system and method that determines when fraudulent activity, such as relates to a credit card, etc., may be imminent. The system and method of the invention allows for warning a credit issuer of probable fraudulent activity at an early stage. Probable fraudulent activity is determined by: receiving at a receiving center an authorization request from a user for a dollar amount; and determining, using a fraud test, if the authorization request is likely to be indicative of fraudulent activity.

15 Claims, 6 Drawing Sheets

| Field Number | Field Name | Maximum Length | Format | Comments |
|---|---|---|---|---|
| 1 | Ani_Phone | 9 | Numeric | CallerId - 10 Digits Required |
| 2 | Card_Number | 16 | Numeric | Must Be 16 digits and not blank |
| 3 | ARU_Date | 8 | YYYYMMDD | Authorization Request Date |
| 4 | ARU_Time | 6 | HHMMSS | Military Time. |
| 5 | Amount | | Currency | Amount Requested. No Zero Amounts |
| 6 | DNIS | 4 | Numeric | |
| 7 | Merchant_Number | 20 | Numeric | Merchant associated with the ANI |
| 8 | Approved | 8 | Numeric | A Number If Approved Empty If Rejected |

Fig. 4

SYSTEM AND METHOD FOR DETECTING FRAUDULENT CALLS

BACKGROUND OF THE INVENTION

This invention relates generally to the field of credit transactions, and in particular to the authorization of credit transactions. More specifically, the invention relates to systems and techniques for detecting fraudulent calls made when requesting whether a credit transaction is authorized.

Toll free authorization request numbers are typically provided to various merchants. Some merchants share toll free authorization request numbers while other merchants have their own private authorization request numbers. These authorization request numbers are intended to be used by merchants to phone in authorizations when a card fails at the point of sale. Using these numbers allows a merchant to continue with a sale when a given card can not be read electronically.

Unfortunately, fraud sometimes takes place when certain individuals are able to learn these authorization request numbers. These individuals may have computer-generated, stolen or otherwise obtained a potential account number. The individuals use the potential account numbers to call an authorization service, via an authorization request number, in order to ascertain whether the potential account number is authorized for a given dollar amount. These fraudulent calls are often made from home phones, cell phones, pay phones, etc. Once the individuals learn that a potential account number is authorized, they may attempt to use the potential account number on the Internet, in a mail order, in a telephone order, in an in person transaction, etc.

BRIEF SUMMARY OF THE INVENTION

The present invention includes systems and methods that determine when fraudulent activity, such as relates to a credit card, may be imminent. The system allows for warning a credit issuer of probable fraudulent activity at an early stage.

In one embodiment of the present invention, probable fraudulent activity is determined. An authorization request for a given dollar amount is received at a receiving center from a user. Using a fraud test, it is determined if the authorization request is likely to be indicative of fraudulent activity.

An investigation area is coupled to the receiving center. The investigation area houses a fraud detection processing system. The fraud test can be run at the investigation area on the fraud detection processing system. A determination is made as to whether the dollar amount falls within a certain threshold. This determination can be considered to be a part of the fraud test in one embodiment. If the dollar amount is within a certain threshold, then at the investigation area the fraud test, or further fraud testing, is run on the authorization request to determine if fraudulent activity is likely.

The receiving center communicates to the user whether or not the dollar amount is authorized. This information is obtained when the receiving center communicates with a management center, which in turn communicates with an appropriate bank.

If it is determined at the investigation area that there is a likelihood of fraud, then this is communicated to the bank via the receiving center and the management center. Appropriate action can then be taken.

In one embodiment, the fraud test can comprise determining an originating phone number, wherein the originating phone number is the phone number from which the authorization request originated, and comparing the originating phone number against a good list of legitimate originating phone numbers. If the originating phone number is not matched with a number in the good list, the originating phone number can be compared against a bad list of illegitimate originating phone numbers. If the originating phone number is matched with a number in the bad list, the originating phone number can be flagged as probably related to fraudulent activity. It is also envisioned that the originating phone number can be compared against the bad list before the good list.

The fraud test can also include any one of: determining if at least one other authorization request has a dollar amount equivalent to the dollar amount of the authorization request; determining if the authorization request is for an even dollar amount; determining if the authorization request occurs at a time that falls within one or more red flag time windows; determining if at least one other authorization request occurs within a red flag time of the authorization request; and determining if a given number of authorization request occurs within a given time frame from the same originating phone number.

A further understanding of the nature and advantages of the inventions herein may be realized by reference to the remaining portions of the specification and the attached drawings.

BRIEF DESCRIPTION OF THE DRAWINGS

FIG. 4 shows the fields used by an export file.

DETAILED DESCRIPTION OF THE INVENTION

Figure 1:
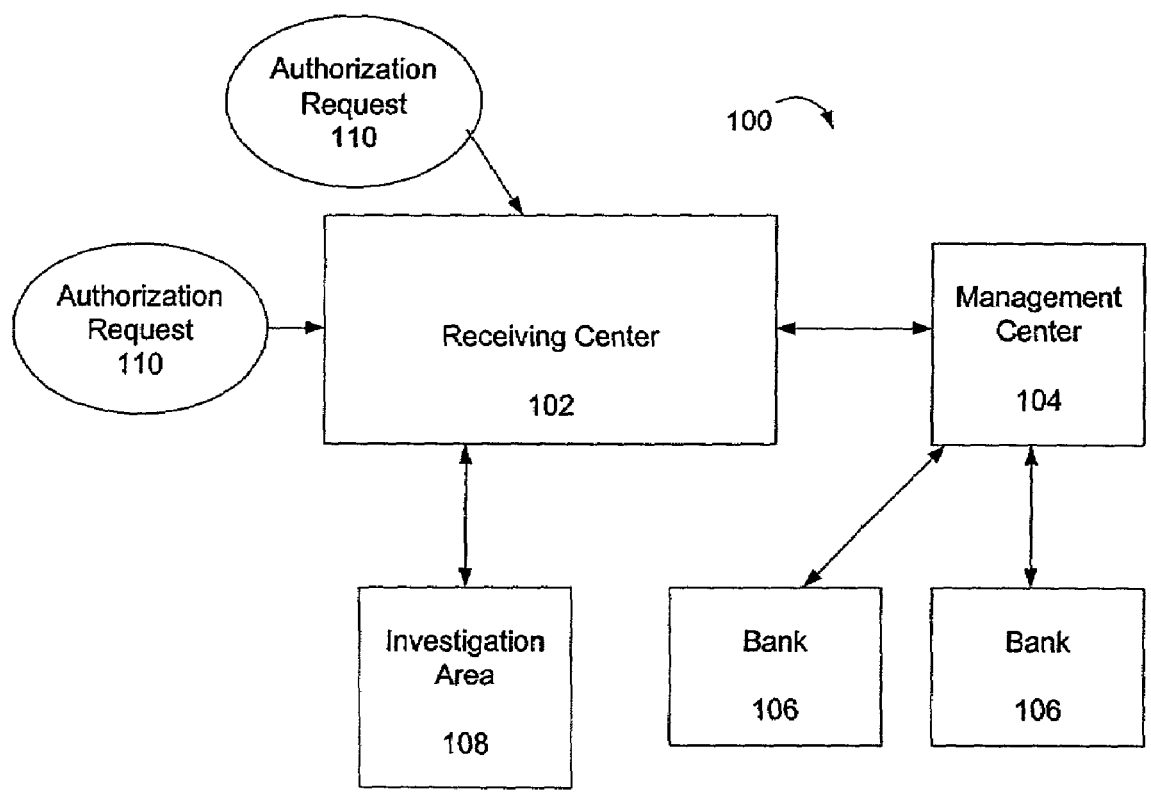
FIG. 1 is one embodiment of a fraud warning system.
Figure 2:
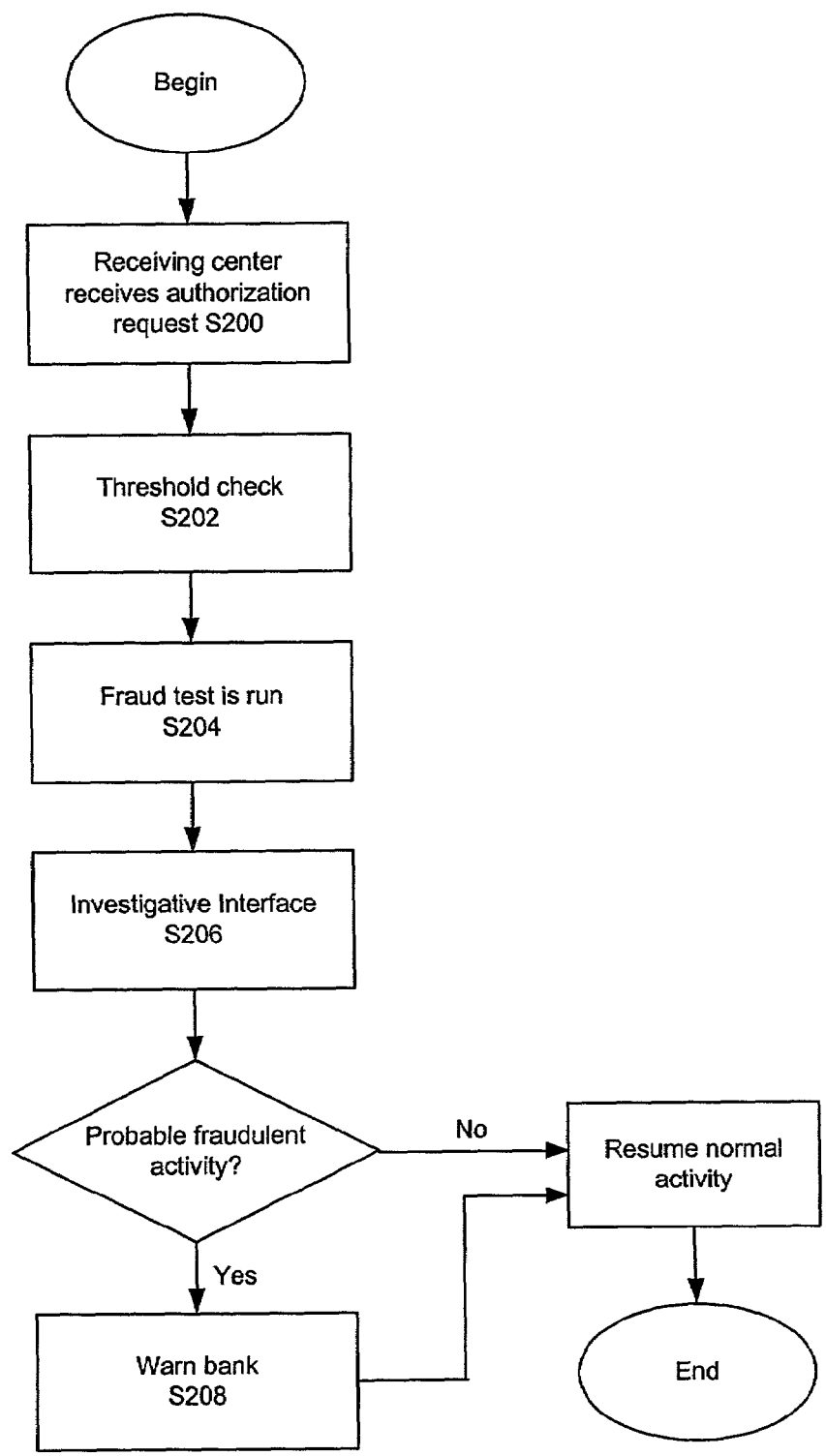
FIG. 2 is a flowchart of one embodiment of a method of determining probable fraudulent activity.

As shown in the exemplary drawings wherein like reference numerals indicate like or corresponding elements among the figures, an embodiment of a system according to the present invention will now be described in detail. The following description sets forth an example of a fraud detection system and methodology. The system can be operated on many different computing platforms, and other variations should be apparent after review of this description.

Referring to FIG. 1, one exemplary embodiment of a fraud warning system 100 is illustrated. A receiving center 102 for receiving communications from merchants is coupled to a management center 104. The management center is in turn coupled to at least one bank 106. As used herein, the term "bank" refers to a bank, financial institution, credit issuer, credit/charge card company or the like.

In keeping with aspects of the invention, the receiving center 102 is coupled to an investigation area 108 that houses a fraud detection processing system. The receiving center can receive authorization requests 110 from users (e.g., merchants, etc.). Such authorization requests are typically received by a telephone call from the merchant. Conveniently, the receiving center may include an interactive voice response unit where all calls may be handled in an automated manner.

In operation, at step S200, the receiving center 102 receives an authorization request for a dollar amount from a user. At this point, it is communicated to the user as to whether or not the dollar amount is authorized. The authorization request also includes an account number for the credit card and optionally the expiration date. This authorization request is typically but not necessarily in the form of a phone call to a toll free number. However, it is contemplated that other suitable forms of communication, such as computers and networks, can be used as well. Each merchant who subscribes to the subject services is assigned one or more toll free numbers.

As mentioned above, sometimes the criminal element steals or generates these numbers and attempts to commit fraud. The criminals typically make an authorization request for a low amount (usually less than $100) to see if the account number, credit card, etc., is authorized for use. The reason for the criminal element trying to authorize a low dollar amount is so that as much credit is still available as possible. Once the criminal receives authorization they typically use the account number to commit fraud by making a purchase. However, it will be appreciated that fraudulent activity may occur with larger requests as well, and the invention may be modified to screen these calls as well.

At step S202, a determination is made as to whether the dollar amount falls within a certain threshold. This determination can be made at the receiving center 102 or the investigation area 108. If the dollar amount is within a certain threshold (e.g., $0 to $100), then a fraud test will be run on the authorization request to determine if fraudulent activity is likely afoot. If not, no further fraud testing is done in one embodiment, and the authorization request is processed as normal. In other embodiments, a fraud test may be run regardless, or the threshold could be increased, e.g., to $250. Determining if the dollar amount is within a certain threshold can be considered to be part of the fraud test.

At step S204, a fraud test is run at the investigation area 108. It should be noted that the aspects of the fraud test can be implemented in software, hardware, manually or by any suitable combination thereof. The fraud test typically is run in the investigation area using the fraud detection processing system. In one embodiment, the fraud test may comprise any combination of the following: determining an originating phone number and comparing it against a good list of legitimate originating phone numbers; determining an originating phone number and comparing it against a bad list of illegitimate originating phone numbers; determining if multiple authorization requests made from the same phone number have equivalent dollar amounts; determining if the authorization request is for an even dollar amount; determining if the authorization request occurs at a time that falls within one or more red flag time windows; determining if at least one other authorization request occurs within a red flag time of the authorization request; determining if a given number of authorization requests occur within a given time frame from the same originating phone number; and the like. At step S204, it is determined as to whether there is probable fraudulent activity.

In one embodiment, the time during which the authorization request 110 came into the receiving center 102 is determined and considered. As an example, if the authorization request came into the receiving center at 7:00 a.m. in the time zone of the receiving center, then the next step might be to determine where (including what time zone) the authorization request originated from. One way this might be determined is to look at the area code of the originating phone number. If it is determined that when the authorization request came in it was also 7:00 at the place from which the authorization request originated, then this might not be indicative of fraudulent activity. On the other hand, if when the authorization request came in it was 5:00 at the place from which the authorization request originated, then this might be indicative of fraudulent activity.

In one embodiment, the fraud test begins by comparing the originating phone number (or other information indicative of where the authorization request originated from) with a list of known good phone numbers. If the originating phone number is not matched with a number in the good list, the originating phone number is then compared against a bad list of known illegitimate originating phone numbers. If the originating phone number is matched with a number in the bad list, the originating phone number might be flagged as probably related to fraudulent activity. Additionally, the originating phone number can be added to the bad list.

The call from the originating phone number (or other communication) can be further investigated if the originating phone number was flagged as probably related to fraudulent activity. The originating phone number can be determined in any suitable manner, such as by using a caller ID system as mentioned above. It is also envisioned that the originating phone number (or other information indicative of where the authorization request originated from) can be compared against the bad list before being compared against the good list.

Any suitable method of analyzing the results from above can be used to determine probably fraudulent activity. As used herein, "probable fraudulent activity," "likely to be indicative of fraudulent activity," "probably related to fraudulent activity" and the like refer to a certain threshold of estimated likelihood that the authorization request came from a source having criminal intent (e.g., not an authorized merchant). This threshold can be changed as desired. Moreover, various levels of probable fraudulent activity can be determined if so desired. One possible manner of determining if there exists probable fraudulent activity is to assigned weights or points to the results of the various steps mentioned above.

At step S206, an investigative interface (e.g., a person) comes into play. This person might query various public and private data bases and conduct proactive investigation (calls the originating phone number in a pretext call) in order to ascertain ownership and control of the phone number. This way the person can verify whether that phone number is related to the merchant account which is involved in the "suspect" transaction which has previously qualified under the fraud search rules as a suspect transaction and as probably being indicative of fraudulent activity. This person, or investigator, then "marks" the transaction and therefore the telephone number (or other authorization request) as good or bad. If it is determined at the investigation area 108 that there exists probable fraudulent activity, then this is communicated to the appropriate bank 106 via the receiving center and the management center at step S208. Thus, the bank is warned that further fraud is imminent. Appropriate action can then be taken, such as performing a more thorough investigation and contacting the authorities and the fraud victim.

Figure 3A:
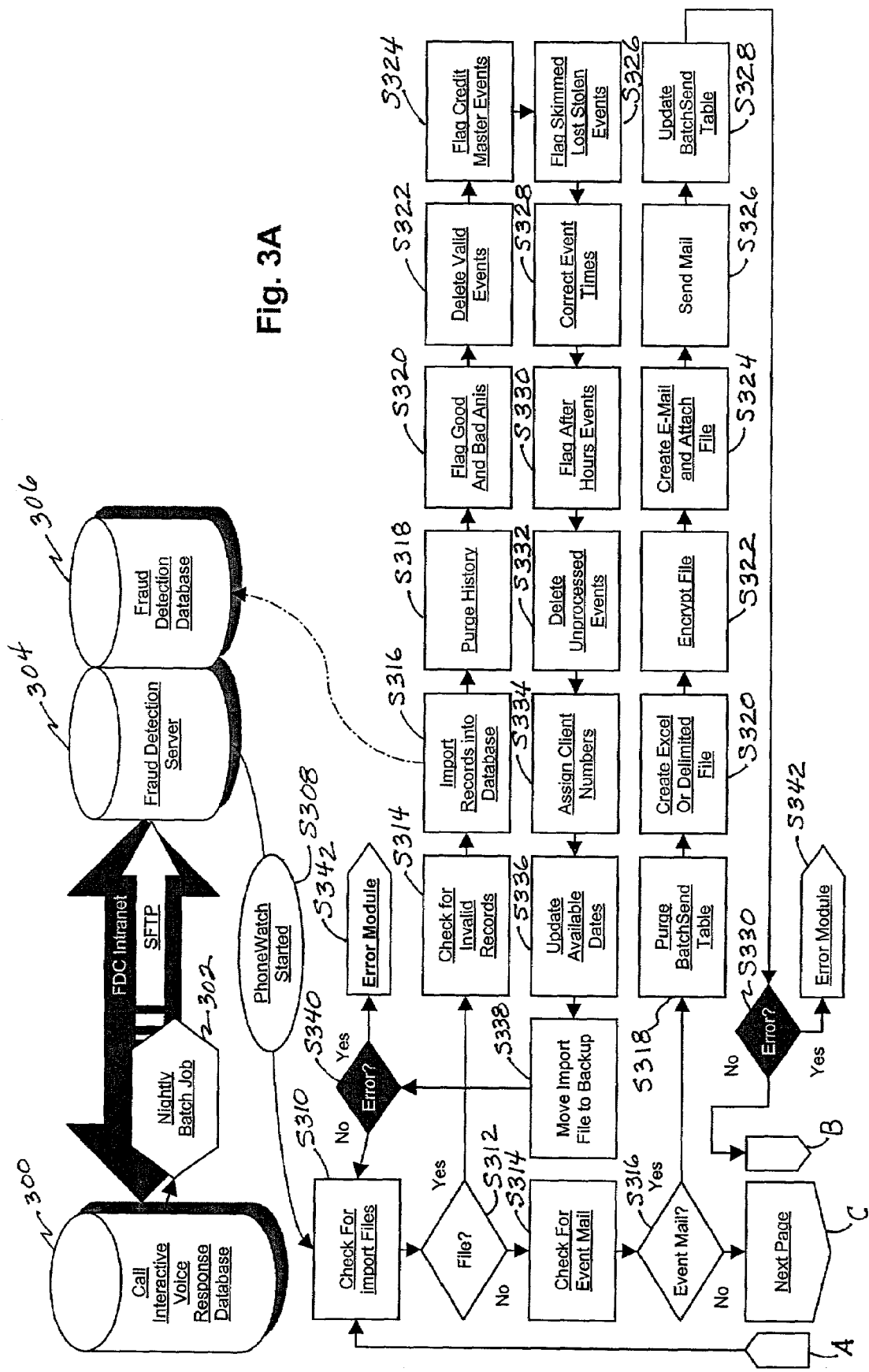
FIG. 3A is a flowchart describing a server process.
Figure 3B:
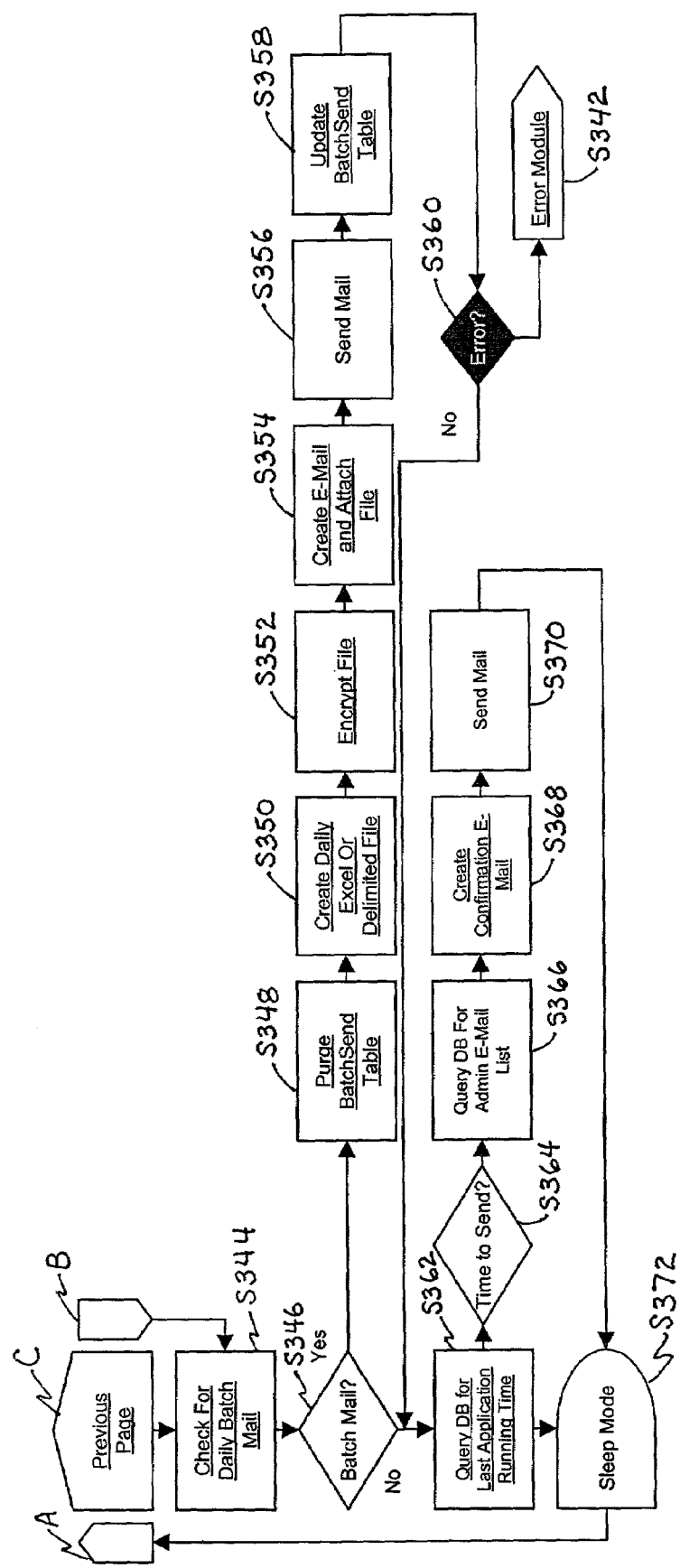
FIG. 3B is a continuation of the flowchart of FIG. 3A.

FIGS. 3A and 3B are flow diagrams of a process according to embodiments of the present invention. The call interactive voice response database 300, which can be within the receiving center 102, can send nightly batch jobs 302 that contain data related to the authorization requests 110. The data is SFTP'd to a Fraud Detection Server 304, which is coupled to a Fraud Detection Database 306.

Periodically, at step S308 a fraud detection process is started; i.e., a fraud test is run. At step S310, the system checks for import files. In one embodiment, at approximately every minute with the exception of the hours between 1:00 a.m. and 3:00 a.m. when backups and file transfers are taking place, the system checks for new import files at a predetermined directory of the Fraud Detection Server 304. If multiple files are present the system will process them one at a time. If no files are present the system continues on to the next task in the loop.

At step S312, if a file is present then the system checks for invalid records at step S314. The field values are checked for invalidity based on a validation number assigned to the field. A count of the invalid and valid records is taken and stored.

At step S316, records that make it past the data cleansing process are imported into the database running on the Fraud Detection Server 304.

At step S318, history is purged. All historical number (or ANI) records with an update date of 180 days (in one embodiment) from the current date, whether good or bad, will be removed from an ANI's Table. All historical records from a Raw Data Table with an ARU date over 180 days will be deleted.

At step S320, good and bad ani's are flagged. All incoming records are checked against the ANI's Table to determine if the incoming event Ani has already been identified as good or bad. If the ANI is good then the record is removed from the Raw Data Table. If is a known bad ANI then it is categorized as such (marked as KBA).

At step S322, valid events are deleted. In one embodiment, if the total events per BIN is two or less and the time span between them is less than two minutes and it is the same card number and it is not marked KBA, then the calling event is most likely valid. The records are deleted from the Raw Data Table. The logic is that if a card number is entered incorrectly the first time, a second event will show up for the same card shortly after.

At step S324, credit master events are flagged. In one embodiment, if the total number of calls per BIN is greater than two, the card numbers match for the first twelve digits, the time between calls is less than or equal to five minutes and the ANI is the same then the event is categorized as CRM. This type of activity suggests card numbers that were automatically generated and possibly the present of an automated dialing system.

At step S326, skimmed lost stolen events are flagged. This requires sorting the current Raw Data by ANI and comparing the area code of the incoming records with the area codes of KBA's previously identified. This is done because certain area codes statistically have a higher rate of fraud associated with them, and therefore generate more consistent matches for this particular type of activity. The count of events must also be greater than or equal to a given number, e.g., 3, for each ANI.

Once this first subset of records has been selected, they are looped through and a second subset of data is created for each ANI keyed by BIN. This is run through another loop that checks to see if within this subset the BIN numbers are different, the amounts are within five cents of each other and the time of the calls were within five minutes of each other. Each time these requirements are met, a count is incremented by one. If after processing all the records in the ANI subset this count is greater than or equal to three, all events for that ANI and associated BIN's are categorized as SLS.

At step S328, event times are corrected. All event times are saved in a certain time zone, e.g., Central Time Zone where the system is located. A calculation must be made based on the ANI's area code.

At step S330, after hours events are flagged. The system checks the event time to see if the transaction took place at an odd hour for the ANI local. If the event hour is between, for example, 3:00 a.m. and 5:00 a.m., then it may be categorized as AFH.

At step S332, unprocessed events are deleted. At this point, the remaining uncategorized records are theoretically valid and of no interest. These events are purged from the Raw Data Table.

At step S334, client numbers are assigned to events. The client number is determined by taking the first six digits of the card number or the BIN.

At step S336, the last server import process appends the current import files' date(s) to the available dates table so it can be selected in a client interface.

At step S338, the import file is moved to backup.

At step S340, a check for errors is run. If there is no error, then the process returns to step S310. Else, the process goes to the error module at step S342. If there is a nonfatal error, then a system administrator is notified. If there is a fatal error, then the process stops.

At step S312, if no file is present then we check for events mail at step S314. Events mail is like a batch file but contains information for only one bad ANI.

At step S316, if there is an event mail then a BatchSend Table is purged at step S318.

At step S320, there is an option to create either an Excel or a delimited file (allowing clients to use data themselves).

At step S322, the file is encrypted and at step S324 an E-mail is created and the file is attached and sent at step S326 based on client information. The BatchSend Table is then updated at step S328. At step S330, an error check is run as before.

Turning now to FIG. 3B, at step S344, a check is done for daily batch mail, because the mail may be in the form of a batch file containing information related to multiple events instead of a single event. The process then runs as before, with steps S346 to S360 corresponding with steps S316 to S328, respectively.

At step S362, if there is no batch mail then the database is queried for the last application running time. If it is time to send an E-mail to the administrators to let them know the system is still up and running, then at step S366 the database is queried for the administrators E-mail list. At steps S368 and S370, the confirmation E-mail created and sent, respectively. At step S372 to system enter a sleep mode for a predetermined period of time, and then returns to step S310.

FIG. 4 shows fields included in the fields used by an export file. The nightly batch job 302 generates these fields. These fields contain data related to the authorization requests. These fields include: the Caller ID phone number, the card number, the authorization request date, the time of the authorization request, the dollar amount requested, the DNIS, the merchant number, and the approval number, if any.

Figure 5:
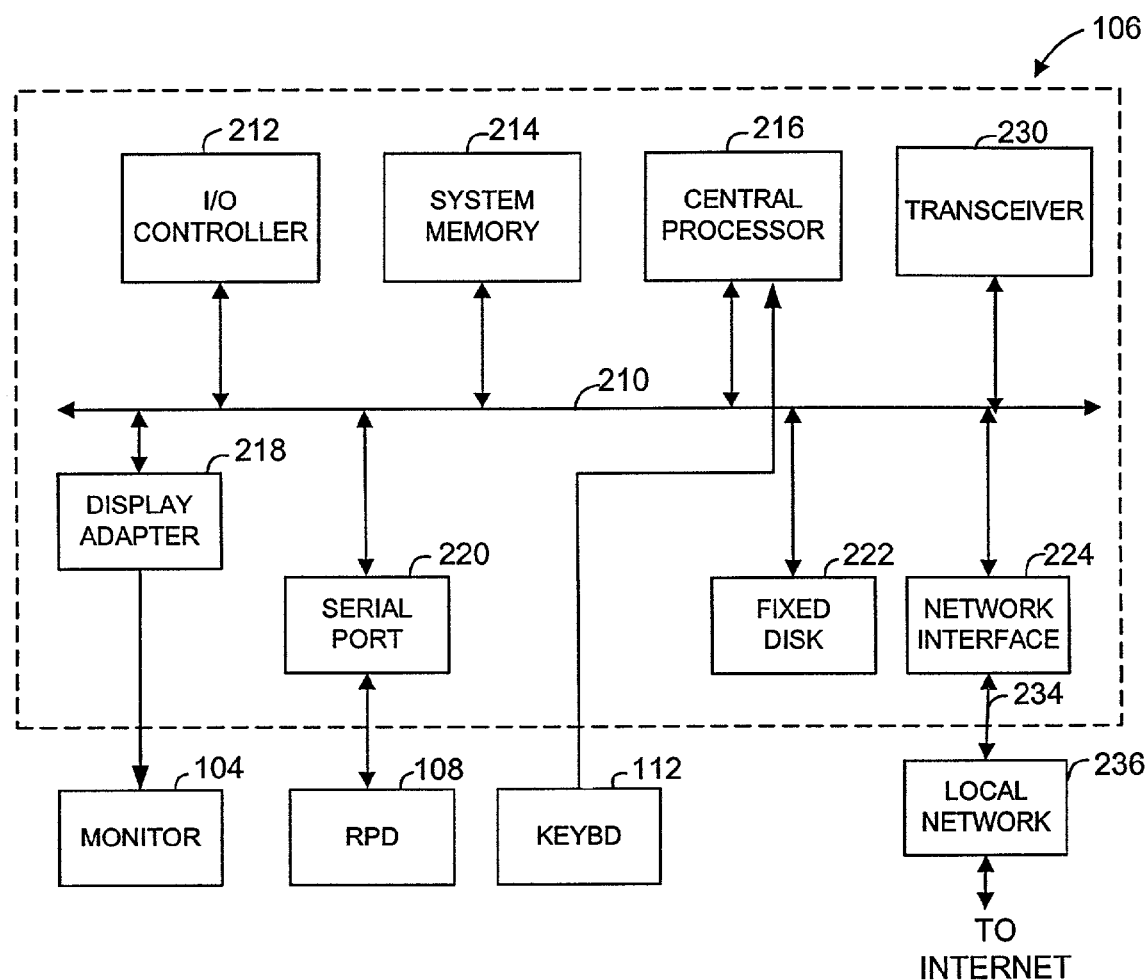
FIG. 5 illustrates subsystems of an exemplary computer system for use with the present invention.

FIG. 5 illustrates subsystems found in one exemplary computer system that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention. This hardware can be used, for example, in the investigation center 108 for analyzing information to determine if fraudulent activity is likely.

Subsystems within are directly interfaced to an internal bus 210. The subsystems include input/output (I/O) controller 212, system random access memory (RAM) 214, central processing unit (CPU) 216, serial port 220, fixed disk 222 and network interface adapter 224. The use of the bus allows each of the subsystems to transfer data among the subsystems and, most importantly, with the CPU. External devices can communicate with the CPU or other subsystems via the bus by interfacing with a subsystem on the bus.

FIG. 5 is illustrative of one suitable configuration for providing a system in accordance with the present invention. Subsystems, components or devices other than those shown in FIG. 5 can be added without deviating from the scope of the invention. A suitable computer system can also be achieved without using all of the subsystems shown in FIG. 5. Other subsystems such as a CD-ROM drive, graphics accelerator, etc., can be included in the configuration without affecting the performance of the system included in the present invention.

One embodiment according to the present invention is related to the use of an apparatus, such as the computer system, for implementing a simulator according to embodiments of the present invention. The processor 216 can execute one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, nonvolatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of computer-readable media may be involved in carrying one or more sequences of one or more instructions to processor 216 for execution. The bus carries the data to the memory 214, from which the processor retrieves and executes the instructions. The instructions received by the memory can optionally be stored on the fixed disk 222 either before or after execution by the processor.

Many subsystem configurations are possible. FIG. 5 is illustrative of but one suitable configuration. Subsystems, components or devices other than those shown in FIG. 5 can be added. A suitable computer system can be achieved without using all of the subsystems shown in FIG. 5.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of detecting fraudulent activity related to a credit card account prior to authorizing the credit card account, the method comprising:
   a) receiving at a communication receiving center, via a telephone call from a person purporting to be a merchant, an authorization request to charge a credit card account for a certain dollar amount, wherein the authorization request includes merchant information and call detail information used to identify the merchant purportedly making the authorization request;
   b) providing a computer system having a database of transaction data used to identify legitimate merchants that are authorized to conduct financial transactions;
   c) transmitting the merchant information and the call detail information received at the communication receiving center to the computer system;
   d) performing one or more circumstantial checks on the authorization request at least in part by comparing the merchant information and the call detail information with the transaction data in the database;
   e) computing, based on the results of the checks, an estimate of the likelihood that the call does not originate from a legitimate merchant;
   f) comparing the resulting estimate with a predetermined threshold;
   g) determining if the estimate exceeds the predetermined threshold; and
   h) based upon the determination that the resulting estimate exceeds the predetermined threshold, producing a record of the authorization request and information indicating that the person was not authorized to conduct financial transactions and that the credit card account is likely to be a stolen or generated credit card account;
   wherein steps d) through h) are performed by the computer system.

2. The method of claim 1, wherein performing one or more circumstantial checks comprises:
   ascertaining an originating telephone number from which the telephone call originated;
   ascertaining ownership of the originating telephone number; and
   checking to see whether the originating telephone number is owned by a legitimate merchant;
   and wherein the method further comprises increasing the estimate by a first amount if the originating telephone number is not owned by a legitimate merchant, and otherwise leaving the estimate unchanged or increasing the estimate by a second amount smaller than the first.

3. The method of claim 1, wherein performing one or more circumstantial checks comprises:
   ascertaining an originating location from which the telephone call originated;

ascertaining, for the originating location, a local time at which the telephone call originated; and comparing the local time with normal business hours at the originating location;

and wherein the method further comprises increasing the estimate by a first amount if the telephone call did not originate during normal business hours, and otherwise leaving the estimate unchanged or increasing the estimate by a second amount smaller than the first.

4. The method of claim 1, wherein:

performing one or more circumstantial checks comprises checking the certain dollar amount to see whether it is an even dollar amount; and the method further comprises increasing the estimate by a first amount if the certain dollar amount is an even dollar amount, and otherwise leaving the estimate unchanged or increasing the estimate by a second amount smaller than the first.

5. The method of claim 1, wherein:

performing one or more circumstantial checks comprises accessing a database holding transaction data relating to previous authorization requests to charge the credit card account and ascertaining from the database whether an authorization request for the same certain dollar amount has previously been received; and the method further comprises increasing the estimate by a first amount if an authorization request for the same certain dollar amount has previously been received, and otherwise leaving the estimate unchanged or increasing the estimate by a second amount smaller than the first.

6. The method of claim 1, wherein performing one or more circumstantial checks comprises:

ascertaining an originating telephone number from which the telephone call originated;

accessing a database holding transaction data relating to previous authorization requests to charge the credit card account;

counting in the database the number of previous authorization requests to charge the credit card account that have been received from the originating telephone number within a predetermined time period; and comparing the number of previous authorization requests with a predetermined count threshold;

and wherein the method further comprises increasing the estimate by a first amount if the number of previous authorization requests exceeds the predetermined count threshold, and otherwise leaving the estimate unchanged or increasing the estimate by a second amount smaller than the first.

7. The method of claim 1, wherein performing one or more circumstantial checks comprises:

accessing a database holding transaction data relating to previous authorization requests to charge the credit card account; and ascertaining whether the authorization request has been received within predetermined time interval of any previous authorization request to charge the credit card account;

and wherein the method further comprises increasing the estimate by a first amount if the authorization request has been received within the predetermined time interval of any previous authorization request to charge the credit card account, and otherwise leaving the estimate unchanged or increasing the estimate by a second amount smaller than the first.

8. The method of claim 1, wherein the amount, estimate, and threshold are measured in weights or points.

9. A system for detecting fraudulent activity related to a credit card account prior to authorizing the credit card account, the system comprising:

a communications receiving center adapted to receive, via a telephone call from a person purporting to be from a merchant, an authorization request to charge a credit card account for a certain dollar amount, wherein the authorization request includes merchant information and call detail information used to identify the merchant purportedly making the authorization request;

a fraud detection processing system communicatively coupled to the communications receiving center;

a database of transaction data used to identify legitimate merchants that are authorized to conduct financial transactions; and wherein the fraud detection processing system is configured to:

transmit the merchant information and the call detail information received at the communication receiving center to the fraud detection processing system;

perform one or more circumstantial checks based at least in part on a comparison of the merchant information and the call detail information with the transaction data in the database;

compute, based on the results of the checks, an estimate of the likelihood that the call does not originate from a legitimate merchant;

compare the resulting estimate with a predetermined threshold;

recognize that the resulting estimate exceeds the predetermined threshold; and based upon the determination that the resulting estimate exceeds the predetermined threshold, produce a record of the authorization request and information indicating that the person is not authorized to conduct financial transactions and that the credit card account is likely to be a stolen or generated credit card account.

10. The system of claim 9, wherein the fraud detection processing system is further configured to:

ascertain an originating telephone number from which the telephone call originated;

ascertain ownership of the originating telephone number;

check to see whether the originating telephone number is owned by a legitimate merchant; and if the originating telephone number is not owned by a legitimate merchant, increase the estimate by a first amount, and otherwise leave the estimate unchanged or increase the estimate by a second amount smaller than the first.

11. The system of claim 9, wherein the fraud detection processing system is further configured to:

ascertain an originating location from which the telephone call originated;

ascertain, for the originating location, a local time at which the telephone call originated;

compare the local time with normal business hours at the originating location; and if the telephone call did not originate during normal business hours, increase the estimate by a first amount, and otherwise leave the estimate unchanged or increase the estimate by a second amount smaller than the first.

12. The system of claim 9, wherein the fraud detection processing system is further configured to:

check the certain dollar amount to see whether it is an even dollar amount; and if the certain dollar amount is an even dollar amount, increase the estimate by a first amount, and otherwise leave the estimate unchanged or increase the estimate by a second amount smaller than the first.

13. The system of claim 9, further comprising a database holding transaction data relating to previous authorization requests to charge the credit card account, and wherein the fraud detection processing system is further configured to:
   ascertain from the database whether an authorization request for the same certain dollar amount has previously been received; and
   if an authorization request for the same certain dollar amount has previously been received, increase the estimate by a first amount, and otherwise leave the estimate unchanged or increase the estimate by a second amount smaller than the first.

14. The system of claim 9, further comprising a database holding transaction data relating to previous authorization requests to charge the credit card account, and wherein the fraud detection processing system is further configured to:
   ascertain an originating telephone number from which the telephone call originated;
   count in the database the number of previous authorization requests to charge the credit card account that have been received from the originating telephone number within a predetermined time period;
   compare the number of previous authorization requests with a predetermined count threshold; and
   if the number of previous authorization requests exceeds the predetermined count threshold, increase the estimate by a first amount, and otherwise leave the estimate unchanged or increase the estimate by a second amount smaller than the first.

15. The system of claim 9, further comprising a database holding transaction data relating to previous authorization requests to charge the credit card account, and wherein the fraud detection processing system is further configured to:
   ascertain from the database whether the authorization request has been received within predetermined time interval of any previous authorization request to charge the credit card account; and
   if the authorization request has been received within the predetermined time interval of any previous authorization request to charge the credit card account, increase the estimate by a first amount, and otherwise leave the estimate unchanged or increase the estimate by a second amount smaller than the first.

\* \* \* \* \*

UNITED STATES PATENT AND TRADEMARK OFFICE
CERTIFICATE OF CORRECTION

PATENT NO. : 7,386,510 B2
APPLICATION NO. : 09/948729
DATED : June 10, 2008
INVENTOR(S) : Robert Degen et al.

Page 1 of 1

It is certified that error appears in the above-identified patent and that said Letters Patent is hereby corrected as shown below:

Col. 10, line 8, the word "reguest" should read --request--

Col. 10, line 10, the word "reguest" should read --request--

Signed and Sealed this

Fifth Day of August, 2008

JON W. DUDAS
*Director of the United States Patent and Trademark Office*